(12) United States Patent
Sakamoto et al.

(10) Patent No.: US 12,663,692 B2
(45) Date of Patent: Jun. 23, 2026

(54) BLUR CORRECTION DEVICE, LENS BARREL, AND IMAGING APPARATUS

(71) Applicant: NIKON CORPORATION, Tokyo (JP)

(72) Inventors: Yusuke Sakamoto, Kawasaki (JP); Sueyuki Ohishi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 67 days.

(21) Appl. No.: 18/289,909

(22) PCT Filed: Apr. 26, 2022

(86) PCT No.: PCT/JP2022/018911
§ 371 (c)(1),
(2) Date: Nov. 8, 2023

(87) PCT Pub. No.: WO2022/239643
PCT Pub. Date: Nov. 17, 2022

(65) Prior Publication Data
US 2024/0248370 A1 Jul. 25, 2024

(30) Foreign Application Priority Data
May 12, 2021 (JP) ................................ 2021-080713

(51) Int. Cl.
*G03B 5/00* (2021.01)
*G03B 17/12* (2021.01)

(52) U.S. Cl.
CPC ............... *G03B 5/00* (2013.01); *G03B 17/12* (2013.01); *G03B 2205/0007* (2013.01)

(58) Field of Classification Search
None
See application file for complete search history.

(56) References Cited

U.S. PATENT DOCUMENTS

| | | | | |
|---|---|---|---|---|
| 5,905,917 A | * | 5/1999 | Imura ...................... | G03B 5/00 |
| | | | | 396/55 |
| 5,973,319 A | * | 10/1999 | Washisu ................. | H04N 23/68 |
| | | | | 348/208.11 |
| 5,974,269 A | * | 10/1999 | Sato ................... | H04N 23/6812 |
| | | | | 348/E5.046 |

(Continued)

FOREIGN PATENT DOCUMENTS

| | | |
|---|---|---|
| CN | 110418034 A | 11/2019 |
| JP | 2001166350 A | * 6/2001 |

(Continued)

OTHER PUBLICATIONS

Apr. 30, 2025 Office Action issued in Japanese Patent Application No. 2023-520959.

(Continued)

*Primary Examiner* — Rodney E Fuller
(74) *Attorney, Agent, or Firm* — Oliff PLC

(57) ABSTRACT

A blur correction device includes a lens holding frame that holds a lens, a holding frame that movably holds the lens holding frame, a first drive unit that drives the lens holding frame with respect to the holding frame in a direction intersecting an optical axis, a lock member configured to move between a lock position that restricts movement of the lens holding frame and a release position that releases restriction, and a detection unit configured to detect an amount of movement of the lock member.

20 Claims, 7 Drawing Sheets

(56) References Cited

U.S. PATENT DOCUMENTS

| | | | | |
|---|---|---|---|---|
| 6,208,810 B1 * | 3/2001 | Imada | .................... | G03B 17/00 |
| | | | | 396/55 |
| 2005/0169618 A1 * | 8/2005 | Akada | ................. | G02B 27/646 |
| | | | | 396/55 |
| 2018/0307004 A1 | 10/2018 | Nagaoka et al. | | |
| 2019/0335105 A1 | 10/2019 | Kitayama et al. | | |

FOREIGN PATENT DOCUMENTS

| | | | | | |
|---|---|---|---|---|---|
| JP | 2009-169128 A | | 7/2009 | | |
| JP | 2015-197660 A | | 11/2015 | | |
| JP | 2016042144 A | * | 3/2016 | | |
| JP | 2017-003403 A | | 1/2017 | | |
| JP | 2017-078822 A | | 4/2017 | | |
| JP | 2019-194691 A | | 11/2019 | | |
| WO | WO-2018198256 A1 | * | 11/2018 | ........... | G03B 17/565 |

OTHER PUBLICATIONS

May 31, 2022 International Search Report issued in International Patent Application No. PCT/JP2022/018911.

May 31, 2022 Written Opinion issued in International Patent Application No. PCT/JP2022/018911.

Dec. 3, 2024 Office Actino issued in Japanese Patent Application No. 2023-520959.

Apr. 14, 2026 Office Action issued in Chinese Patent Application No. 202280033607.2.

* cited by examiner

BLUR CORRECTION DEVICE, LENS BARREL, AND IMAGING APPARATUS

TECHNICAL FIELD

The present disclosure relates to a blur correction device, a lens barrel, and an imaging apparatus.

BACKGROUND ART

As a blur correction device that reduces blur of a captured image due to camera shake or the like, there has been proposed a blur correction device including a movable frame that holds a lens for blur correction, a fixed frame that holds the movable frame in a relatively movable manner, and a lock ring that locks the movable frame when blur correction is not performed (see, for example, Patent Document 1). It is desired to reduce noise when the lock ring is driven.

PRIOR ART DOCUMENT

Patent Document

Patent Document 1: Japanese Patent Application Laid-Open No. 2009-169128

SUMMARY OF THE INVENTION

In a first aspect, a blur correction device includes: a lens holding frame that holds a lens; a holding frame that movably holds the lens holding frame; a first drive unit that drives the lens holding frame with respect to the holding frame in a direction intersecting an optical axis; a lock member configured to move between a lock position that restricts movement of the lens holding frame and a release position that releases restriction; and a detection unit configured to detect an amount of movement of the lock member.

In a second aspect, a lens barrel includes the above blur correction device.

In a third aspect, an imaging apparatus includes the above blur correction device.

The configurations of the embodiments described below may be appropriately improved, and at least a part of the configurations may be replaced with another configuration. Furthermore, constituent elements whose arrangement is not particularly limited are not limited to the arrangement disclosed in the embodiment, and can be arranged at positions where their functions can be achieved.

MODES FOR CARRYING OUT THE INVENTION

Figure 1:
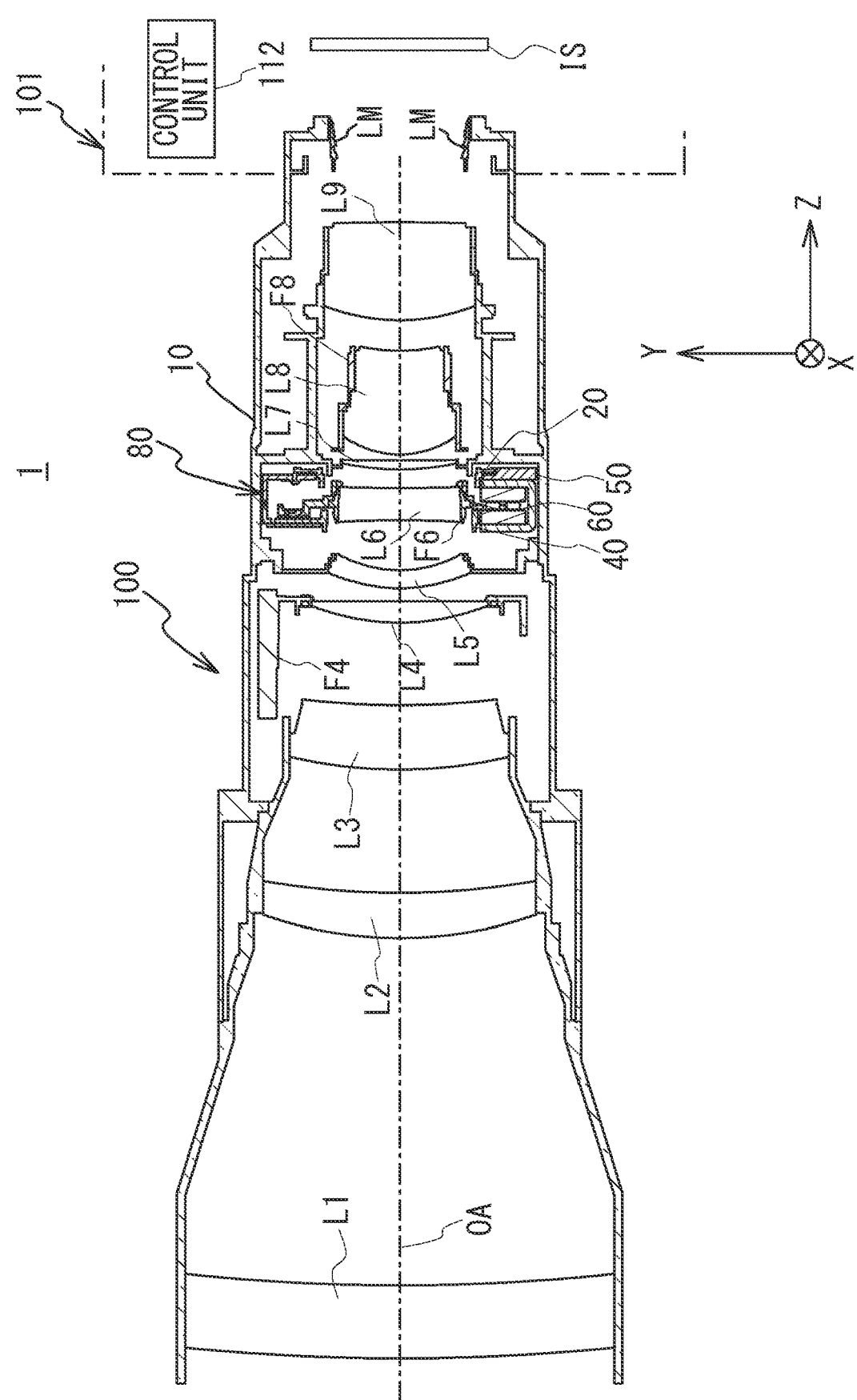
FIG. 1 is a diagram illustrating a camera including: a lens barrel including a blur correction device in accordance with an embodiment; and a camera body.

Hereinafter, a blur correction device 80 in accordance with an embodiment will be described in detail with reference to the drawings. In the drawings described below, an XYZ orthogonal coordinate system is provided as appropriate for ease of description and understanding. In this coordinate system, a +Z direction is the direction from the subject toward a camera body 101 in the camera position (hereinafter referred to as a normal position) when a photographer takes a horizontally long image with the optical axis OA being horizontal. In addition, the direction toward the right side when viewed from the camera body 101 side in the normal position is a +X direction. In addition, the direction toward the upper side in the normal position is a +Y direction. The shape, length, thickness, and other scale of each part illustrated in the embodiments do not necessarily correspond to the actual product, and in each figure, some elements may be omitted for ease of understanding.

FIG. 1 is a diagram illustrating a camera 1 including a lens barrel 100 including the blur correction device 80 in accordance with the present embodiment and the camera body 101. In the present embodiment, the lens barrel 100 is attachable to and detachable from the camera body 101, but this does not intend to suggest any limitation, and the lens barrel 100 and the camera body 101 may be integrated.

The camera body 101 includes an image sensor IS, a control unit 112, and the like therein. The image sensor IS is composed of photoelectric conversion elements such as charge coupled devices (CCDs), for example, and converts a subject image formed by the imaging optical system (the lens barrel 100 attached to the camera body 101) into an electric signal.

The control unit 112 includes a central processing unit (CPU) and the like, and integrally controls the entire operation of the camera 1 related to photographing including focus driving in the camera body 101 and the attached lens barrel 100 and blur correction of a captured image due to camera shake or the like.

As illustrated in FIG. 1, the lens barrel 100 in accordance with the present embodiment includes a fixed barrel 10. In the present embodiment, the fixed barrel 10 is composed of a plurality of components, but may be composed of one component. As illustrated in FIG. 1, a lens mount LM that allows the lens barrel 100 to be attached to and detached from the camera body 101 is fixed to the fixed barrel 10.

Further, the lens barrel 100 includes a plurality of lens groups L1 to L9 sequentially arranged along a common optical axis OA. The lens group L4 is held by a lens holding frame F4, the lens group L6 is held by a lens holding frame F6, and the lens group L8 is held by a lens holding frame F8. Other lens groups are held by the fixed barrel 10. Each of the lens groups L1 to L9 may be composed of one lens or may be composed of a plurality of lenses.

The lens group L6 is a vibration reduction (VR) lens, and can be moved in a plane perpendicular to the optical axis OA by the blur correction device 80 described later when blur correction is performed.

Figure 2:
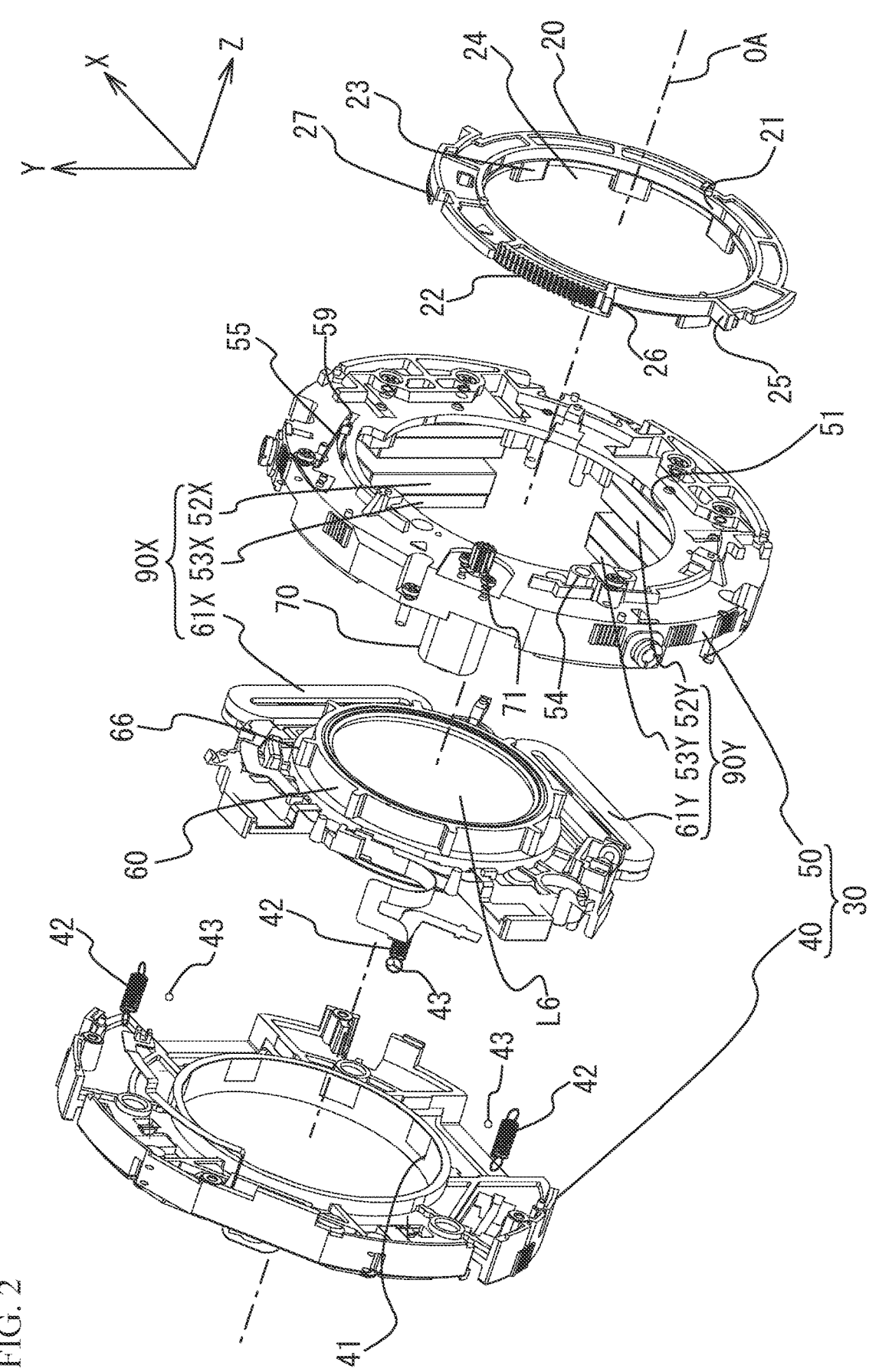
FIG. 2 is an exploded perspective view of the blur correction device.

FIG. 2 is an exploded perspective view of the blur correction device 80.

As illustrated in FIG. 2, the blur correction device 80 includes a movable frame 60, a holding frame 30, and a lock ring 20.

The movable frame 60 holds the lens group L6 through the lens holding frame F6 and moves in the X-Y plane perpendicular to the optical axis OA (Z-axis).

The holding frame 30 includes a base member 40 and a fixed frame 50. As illustrated in FIG. 2, the base member 40 is a substantially annular member having a circular hole 41 in the center thereof, and unlike the movable frame 60, does not move in a plane perpendicular to the optical axis OA, but holds the movable frame 60 so that the movable frame 60 is relatively movable in the plane perpendicular to the optical axis OA. More specifically, the base member 40 holds the movable frame 60 through steel balls 43 and coil springs 42.

The movable frame 60 and the base member 40 are biased in a direction in which they pull toward each other by the coil springs 42 in a state in which the steel balls 43 are interposed therebetween. The coil spring 42 couples the base member 40 and the movable frame 60 in the optical axis OA direction and prevents the base member 40 and the movable frame 60 from being separated from each other in the optical axis OA direction.

The base member 40 and the movable frame 60 each have contact surfaces that are in contact with the steel balls 43 at the respective positions where the steel balls 43 are disposed. When the movable frame 60 moves in a plane perpendicular to the optical axis OA, the steel balls 43 rotate between the contact surfaces of the base member 40 and the contact surfaces of the movable frame 60. This allows the movable frame 60 to move in parallel with respect to the base member 40 in a low friction state.

The fixed frame 50 is a substantially annular member having a circular hole 51 in the center thereof. Unlike the movable frame 60, the fixed frame 50 does not move in a plane perpendicular to the optical axis OA.

Figure 3:
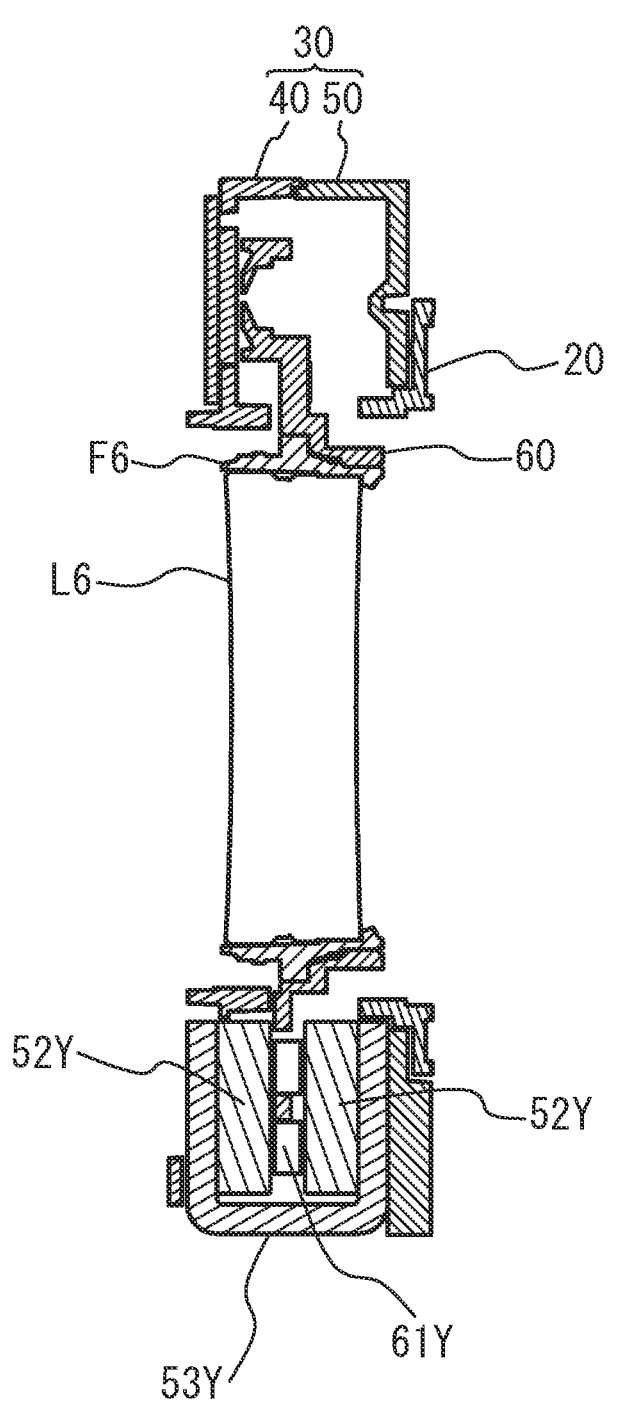
FIG. 3 is a cross-sectional view of the blur correction device.
Figure 3:
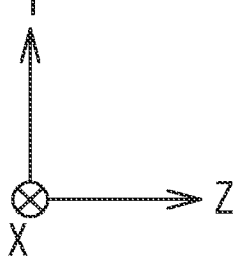

Next, driving of the lens group L6 will be described. FIG. 3 is a cross-sectional view of the blur correction device 80. The lens group L6 held by the movable frame 60 is moved in the X-Y plane by voice coil motors (VCMs) 90X and 90Y to correct image blur. The VCM 90X is an actuator for driving the lens group L6 in the X-axis direction, and includes an X-axis direction drive coil 61X, a pair of X-axis direction drive magnets 52X, and a yoke 53X. The VCM 90Y is an actuator for driving the lens group L6 in the Y-axis direction, and includes a Y-axis direction drive coil 61Y, a pair of Y-axis direction drive magnets 52Y, and a yoke 53Y. The pair of X-axis direction drive magnets 52X and the pair of Y-axis direction drive magnets 52Y are in-plane two-pole magnetized magnets having two poles polarized into north and south poles.

In the present embodiment, the X-axis direction drive coil 61X and the Y-axis direction drive coil 61Y for driving in the Y-axis direction are attached to the movable frame 60. On the other hand, the yoke 53X is attached to the fixed frame 50 at the position corresponding to the X-axis direction drive coil 61X, and the X-axis direction drive magnets 52X are attached to the yoke 53X. The yoke 53Y is attached to the movable frame 60 at the position corresponding to the Y-axis direction drive coil 61Y, and the Y-axis direction drive magnets 52Y are attached to the yoke 53Y.

As illustrated in FIG. 3, when a current flows through the Y-axis direction drive coil 61Y disposed between the Y-axis direction drive magnets 52Y, the Y-axis direction drive coil 61Y receives a Lorentz force and drives the movable frame 60 in the Y-axis direction. Thus, the lens group L6 held by the movable frame 60 can be moved in the Y-axis direction.

The yoke 53Y and the Y-axis direction drive magnets 52Y may be attached to the movable frame 60, and the Y-axis direction drive coil 61Y may be attached to the fixed frame 50. Since the same applies to the VCM 90X, a detailed description thereof will be omitted.

The lock ring 20 is a substantially annular member having a circular hole 21 in the center thereof, and is a member for locking the movable frame 60 so that the movable frame 60 does not move relative to the holding frame 30 when the blur correction is not performed.

Figures 4A, 4B:
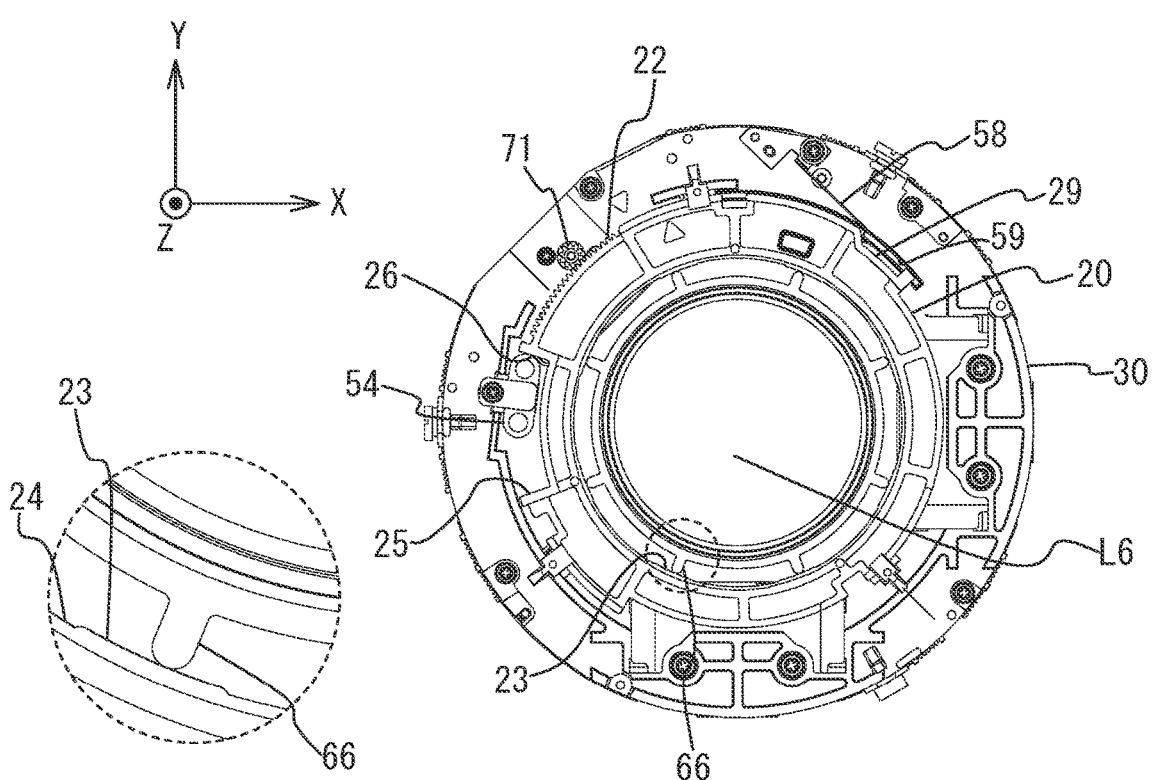
FIG. 4A and FIG. 4B are views of the blur correction device viewed from the camera body side.

FIG. 4A and FIG. 4B are views of the blur correction device 80 as viewed from the camera body 101 side. FIG. 4A illustrates a case where the lock ring 20 is located in the unlock position that allows the movement of the lens group L6 in a plane perpendicular to the optical axis OA, and FIG. 4B illustrates a case where the lock ring 20 is located in the lock position that restricts the movement of the lens group L6 in the plane perpendicular to the optical axis OA. In FIG. 4A and FIG. 4B, the lower left part is an enlarged view of the dotted line portion.

The lock ring 20 is rotated around the optical axis OA by a motor 70 (see FIG. 2) attached to the fixed frame 50, and moves between the lock position that restricts the movement of the movable frame 60 and the unlock position that releases the restriction.

More specifically, as illustrated in FIG. 2, FIG. 4A, and FIG. 4B, a gear portion 22 is formed on the outer peripheral portion of the lock ring 20, and meshes with a pinion gear 71 attached to the rotation shaft of the motor 70. Therefore, the rotational force of the motor 70 is transmitted to the lock ring 20, and the lock ring 20 is driven to the lock position (FIG. 4B) and the unlock position (FIG. 4A) by the positive rotation and the negative rotation of the motor 70. As the motor 70, a DC motor, a stepping motor, an ultrasonic motor, or the like can be used.

As illustrated in FIG. 2, on the inner circumferential surface of the lock ring 20, protrusions 23 protruding toward the optical axis OA side and gap portions 24 are alternately formed in the circumferential direction. When the lock ring 20 is in the lock position, the protrusions 23 are in contact with protrusions 66 of the movable frame 60 to prohibit the movement of the movable frame 60. When the lock ring 20 is rotated around the optical axis OA from the lock position to the unlock position, the contact state between the protrusions 23 and the protrusions 66 of the movable frame 60 is released, and in the unlock position, the protrusions 66 face the gap portions 24 formed between the protrusions 23. As a result, the movable frame 60 can move for the blur correction operation.

In the present embodiment, a restricting member 58 that restricts movement of the lock ring 20 is attached to the fixed frame 50 so that the lock ring 20 does not move from the lock position due to impact or vibration when the lock ring 20 is in the lock position. The restricting member 58 is, for example, a plate spring.

A recessed portion 29 is provided on the outer peripheral surface of the lock ring 20 with which the tip of the restricting member 58 comes into contact. The recessed portion 29 is provided at a position where the recessed portion 29 does not engage with the tip of the restricting member 58 when the lock ring 20 is in the unlock position and engages with the tip of the restricting member 58 when the lock ring 20 is in the lock position. Therefore, when the lock ring 20 is in the lock position, the tip of the restricting member 58 engages with the recessed portion 29 and biases the lock ring 20 in a direction opposite to the direction in which the lock ring 20 moves from the lock position to the unlock position. Thus, the lock ring 20 can be reliably locked in the lock position.

The lock ring 20 has a first contact portion 25 that comes into contact with one end of an elastic member 54 attached to the fixed frame 50 to stop the lock ring 20 when driven to the unlock position, and a second contact portion 26 that comes into contact with the other end of the elastic member 54 to stop the lock ring 20 when driven to the lock position. The elastic member 54 is made of, for example, rubber.

Here, it is desirable that the time required for the lock ring 20 to move from the lock position to the unlock position and the time required for the lock ring 20 to move from the unlock position to the lock position be short. Therefore, it is conceivable to increase the moving speed (rotation speed) of the lock ring 20.

However, if the moving speed (rotation speed) of the lock ring 20 remains high when the first contact portion 25 or the second contact portion 26 comes into contact with the elastic member 54, the impact when the first contact portion 25 or the second contact portion 26 comes into contact with the elastic member 54 becomes large, and a large sound may be generated. Therefore, it is desirable that the moving speed of the lock ring 20 is low when the first contact portion 25 or the second contact portion 26 comes into contact with the elastic member 54.

In this regard, for example, it is conceivable to reduce the moving speed of the lock ring 20 before the first contact portion 25 or the second contact portion 26 comes into contact with the elastic member 54 by reducing the number of rotations (rpm) of the motor 70 when a predetermined time has elapsed since the start of driving of the motor 70. However, when the driving of the motor 70 is controlled based on the elapsed time from the start of the driving of the motor 70, the accurate amount of movement of the lock ring 20 is not known. Therefore, depending on the individual difference of the lock ring 20, the first contact portion 25 or the second contact portion 26 may come into contact with the elastic member 54 before the moving speed of the lock ring 20 is reduced. In this case, the collision sound between the first contact portion 25 or the second contact portion 26 and the elastic member 54 cannot be reduced. In addition, for example, the driving of the motor 70 may be stopped before the first contact portion 25 or the second contact portion 26 comes into contact with the elastic member 54, and the lock ring 20 may not reach the lock position or the unlock position.

Therefore, in the present embodiment, a detection unit that detects the amount of movement (amount of rotation) of the lock ring 20 is provided, and the motor 70 is controlled based on the amount of movement of the lock ring 20 detected by the detection unit to control the moving speed (rotation speed) of the lock ring 20.

Figures 5A, 5B, 5C:
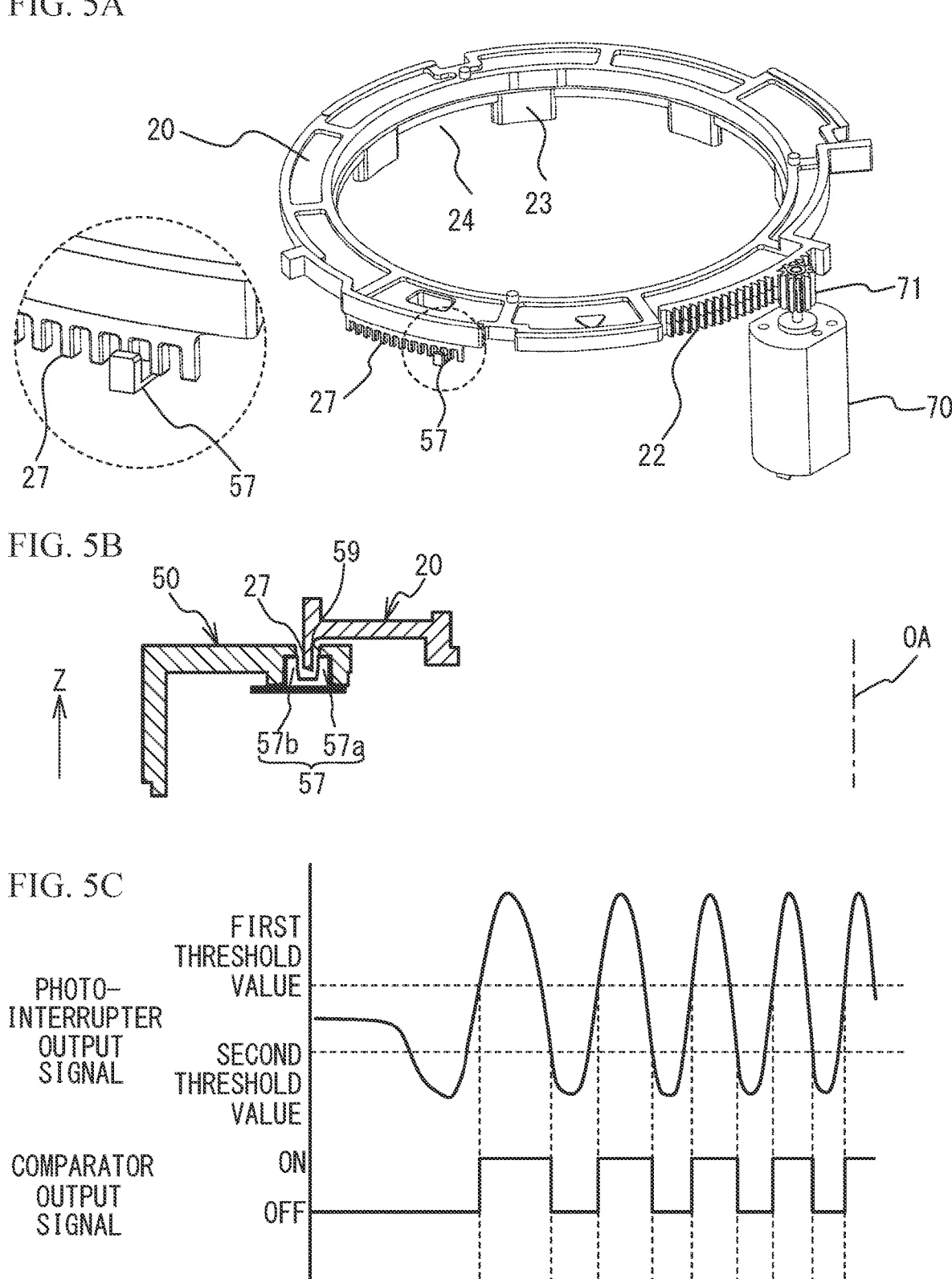
FIG. 5A is a perspective view of a lock ring.
FIG. 5B is a cross-sectional view illustrating a relationship between the lock ring and a fixed frame.
FIG. 5C is a view illustrating a change in a signal level output from a photointerrupter in accordance with movement of the lock ring.

FIG. 5A is a perspective view of the lock ring 20, and FIG. 5B is a cross-sectional view illustrating a relationship between the lock ring 20 and the fixed frame 50. In FIG. 5A, the lower left drawing is an enlarged view of the dotted line portion.

As illustrated in FIG. 5A, a comb-teeth portion 27 for detecting the amount of movement of the lock ring 20 is provided on the outer peripheral portion of the lock ring 20. The comb-teeth portion 27 is disposed in a groove 59 formed in the fixed frame 50.

A photointerrupter 57 is provided in the groove 59 of the fixed frame 50. The photointerrupter 57 includes a light-emitting unit 57a and a light-receiving unit 57b that faces the light-emitting unit 57a across the comb-teeth portion 27 and receives light emitted from the light-emitting unit 57a. In FIG. 5B, the light-emitting unit 57a and the light-receiving unit 57b may be arranged reversely.

FIG. 5C is a diagram illustrating a change in the signal level output from the photointerrupter 57 in accordance with the movement of the lock ring 20. As illustrated in FIG. 5C, when the lock ring 20 moves, light passing between the light-emitting unit 57a and the light-receiving unit 57b is blocked by the comb-teeth portion 27. Since the output signal of the photointerrupter 57 is an analog signal, it is converted into a digital signal by, for example, a comparator. For example, the comparator outputs an ON signal when the output signal level of the photointerrupter 57 is equal to or higher than a first threshold value, and outputs an OFF signal when the output signal level of the photointerrupter 57 is equal to or lower than a second threshold value smaller than the first threshold value. The amount of movement of the lock ring 20 can be detected based on the number of edges of the digital signal output from the comparator.

Next, control of the motor 70 (control of the moving speed of the lock ring 20) according to the amount of movement of the lock ring 20 detected using the comb-teeth portion 27 and the photointerrupter 57 will be described.

Figure 6:
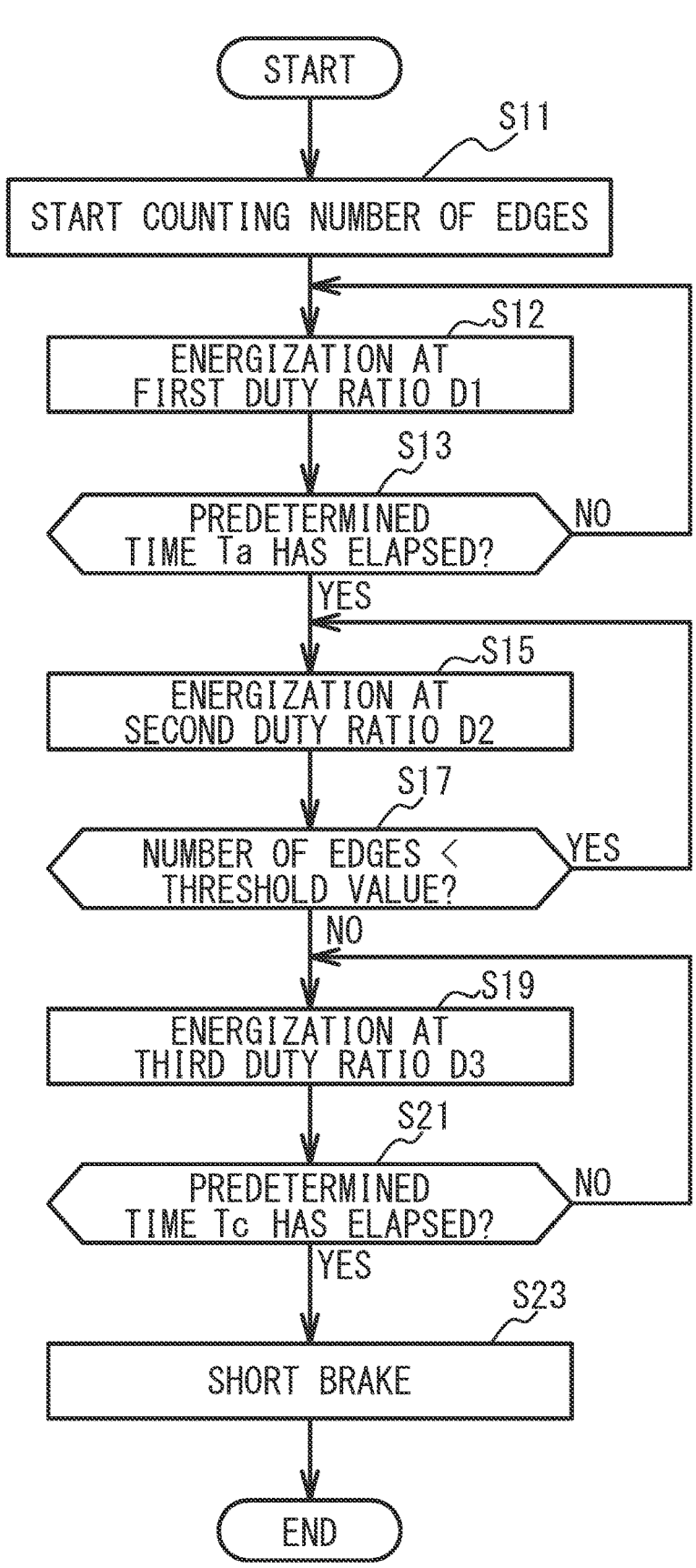
FIG. 6 is a flowchart illustrating a process of controlling a motor.
Figure 7:
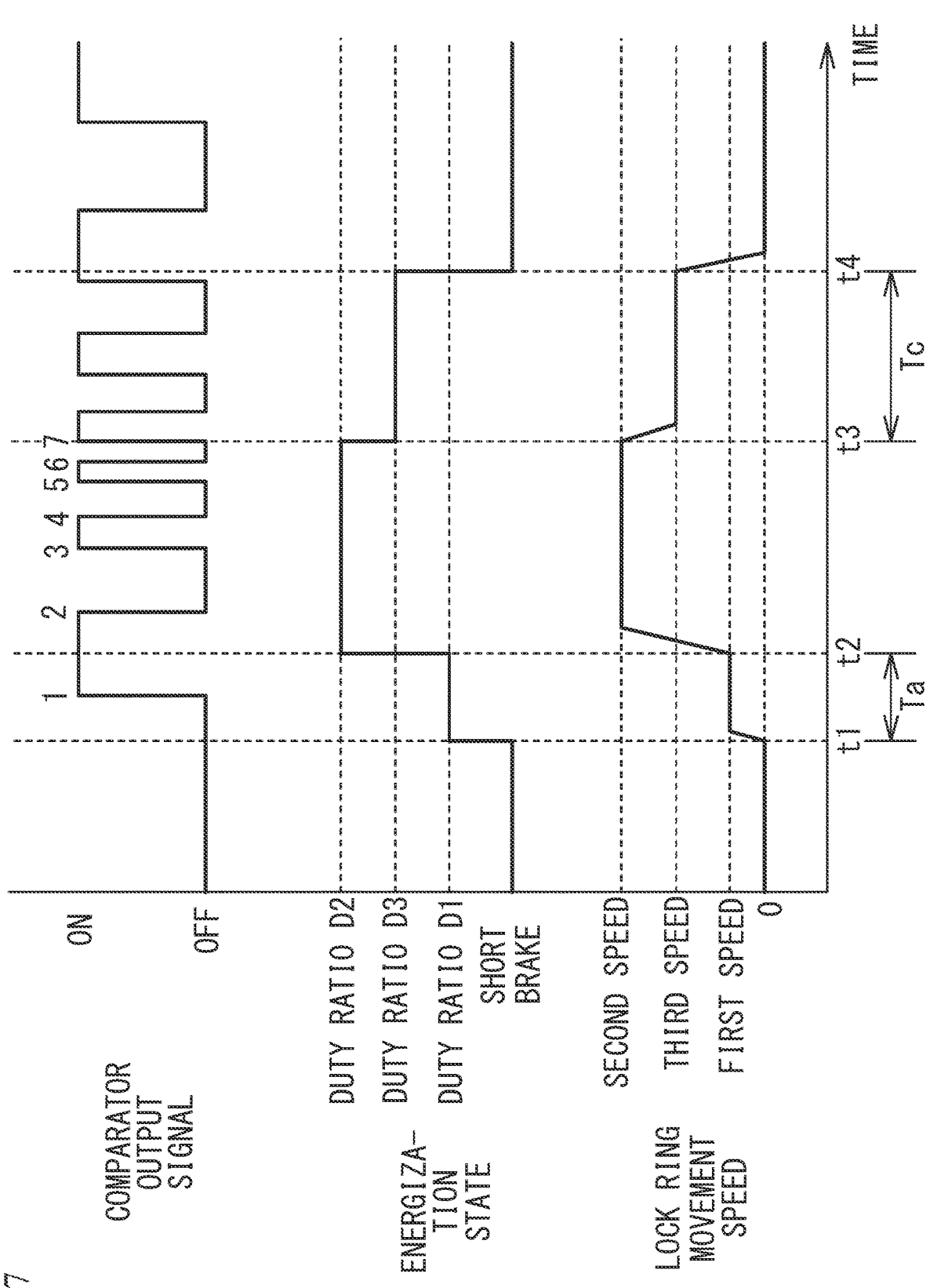
FIG. 7 is a timing chart for describing the process of FIG. 6.

FIG. 6 is a flowchart illustrating a process of controlling the motor 70. In the present embodiment, an example in which the control unit 112 provided in the camera body 101 controls the motor 70 will be described, but the motor 70 may be controlled by a control unit provided in the lens barrel 100. FIG. 7 is a timing chart for describing the processing of FIG. 6. In FIG. 7, the numbers provided above the comparator output signal indicate the number of edges.

The process of FIG. 6 is started when a command to move the lock ring 20 from the lock position to the unlock position or from the unlock position to the lock position is issued. In the following description, the lock ring 20 is rotated clockwise (positive rotation) from the lock position to the unlock position.

In the process of FIG. 6, first, in step S11, the control unit 112 starts counting the number of edges of the signal output from the comparator. For example, in FIG. 7, it is assumed that the control unit 112 receives a command to move the lock ring 20 to the unlock position at time t1. In this case, the control unit starts counting the number of edges of the comparator output signal from time t1.

Next, in step S12, the control unit 112 starts energizing the motor 70 at a first duty ratio D1. In the example of FIG. 7, the motor 70 is energized at the first duty ratio D1 from time t1. Thus, the lock ring 20 moves (rotates) at a first speed, for example. Here, the duty ratio D is a ratio between a time t during which the voltage is applied and a time during which the short brake is performed in the predetermined period T, and is represented by $D = \tau/T$. Further, the short brake means that the terminals of the motor 70 are short-circuited to temporarily prevent the motor 70 from moving.

Next, in step S13, the control unit 112 determines whether a predetermined time Ta has elapsed since the energization of the motor 70 is started at the first duty ratio D1. Here, the predetermined time Ta is, for example, 3 [ms], and is set to a time sufficient for the pinion gear 71 attached to the rotation shaft of the motor 70 to idle by a backlash amount and to mesh with the gear portion 22 of the lock ring 20. Further, the first duty ratio D1 is set to a value that can reduce the collision sound when the pinion gear 71 comes into contact with the gear portion 22.

When the predetermined time Ta has not elapsed (step S13/NO), the control unit 112 continues energization at the first duty ratio D1. On the other hand, when the predetermined time Ta has elapsed (step S13/YES), the process proceeds to step S15, and the control unit 112 energizes the motor 70 at a second duty ratio D2 larger than the first duty ratio D1. For example, in the example in FIG. 7, at time t2 after the predetermined time Ta has elapsed from time t1, the control unit 112 changes the duty ratio at which the motor 70 is energized from the first duty ratio D1 to the second duty ratio D2 (D1<D2). As a result, as illustrated in FIG. 7, since the rotation speed of the motor 70 increases, the moving speed of the lock ring 20 increases from the first speed to a second speed. As described above, when the pinion gear 71 and the gear portion 22 of the lock ring 20 mesh with each other, the control unit 112 increases the moving speed of the lock ring 20. Therefore, it is possible to shorten the time for the lock ring 20 to reach the lock position or the unlock position.

Then, in step S17, the control unit 112 determines whether the number of edges that has been started to count in step S11 is less than a predetermined value (for example, seven edges). In step S17, it is determined whether the lock ring 20 has moved by a predetermined amount (predetermined angle). The threshold value for the number of edges is set within a range of the amount of movement in which the lock ring 20 does not contact the elastic member 54.

When the number of edges is less than the predetermined value (step S17/YES), the control unit 112 continues the energization of the motor 70 at the second duty ratio D2. On the other hand, when the number of edges is equal to or larger than the predetermined value (step S17/NO), the process proceeds to step S19, and the control unit 112 energizes the motor 70 at a third duty ratio D3 smaller than the second duty ratio D2. For example, in the case that the threshold value for the number of edges is 7, as illustrated in FIG. 7, the control unit 112 changes the duty ratio at which the motor 70 is energized from the second duty ratio D2 to the third duty ratio D3 (D3<D2) at time t3 when the number of edges reaches the threshold value 7. As a result, as illustrated in FIG. 7, since the rotation speed of the motor 70 decreases, the moving speed of the lock ring 20 also decreases from the second speed to a third speed Since the moving speed of the lock ring 20 can be reduced before the lock ring 20 comes into contact with the elastic member 54, impact force when the lock ring 20 collides with the elastic member 54 can be reduced, and collision noise can be reduced.

Then, in step S21, the control unit 112 determines whether a predetermined time Tc (for example, 10 [ms]) has elapsed from the start of energization at the third duty ratio D3. The predetermined time Tc is set to a time that ensures that the lock ring 20 comes into contact with the elastic member 54 attached to the fixed frame 50 if the motor 70 is energized at the third duty ratio D3 for the predetermined time Tc after the lock ring 20 moves by the predetermined amount.

When the predetermined time Tc has not elapsed (step S21/NO), the control unit 112 continues energization at the third duty ratio D3. On the other hand, when the predetermined time Tc has elapsed (step S21/YES), the process proceeds to step S23, and the control unit 112 brings the motor 70 into the short brake state and ends the process That is, the control unit 112 stops driving of the motor 70 after the lock ring 20 comes into contact with the elastic member 54. In the example illustrated in FIG. 7, the control unit 112 brings the motor 70 into the short brake state at time t4 when the predetermined time Tc has elapsed from time t3, and ends the process. Thus, the lock ring 20 can be reliably moved to the lock position.

The first duty ratio D1 may be the same as the third duty ratio D3, may be larger than the third duty ratio D3, or may be smaller than the third duty ratio D3 as long as the first duty ratio D1 is smaller than the second duty ratio D2.

As described above in detail, in the present embodiment, the blur correction device 80 includes the movable frame 60 that holds the lens group L6, the holding frame 30 that movably holds the movable frame 60, the VCMs 90X and 90Y that drive the movable frame 60 relative to the holding frame 30 in a direction intersecting the optical axis OA, the lock ring 20 that moves between the lock position that restricts the movement of the movable frame 60 and the unlock position that releases the restriction, and the detection unit that detects the amount of the movement of the lock ring 20. In the present embodiment, the detection unit is implemented by the comb-teeth portion 27 formed in a part of the lock ring 20, the photointerrupter 57 including the light-emitting unit 57a and the light-receiving unit 57b, and the control unit 112. Since the accurate amount of movement of the lock ring 20 can be acquired, the drive control of the motor 70 based on the amount of movement of the lock ring 20 is possible. As a result, for example, before the lock ring 20 comes into contact with the elastic member 54, the rotation speed of the motor 70 is reduced so that the collision sound between the lock ring 20 and the elastic member 54 can be reduced or the lock ring 20 can be reliably moved to the lock position/unlock position. When the motor 70 is a stepping motor, it is possible to detect the step-out of the stepping motor. In addition, more precise control is possible than in a case where the motor 70 is controlled based on the elapsed time from the start of driving of the lock ring 20.

In the present embodiment, the blur correction device 80 includes the motor 70 that drives the lock ring 20, and the control unit 112 that controls the motor 70 based on the detected amount of movement of the lock ring 20. Thus, for example, by performing control to increase the rotation speed of the motor 70 based on the amount of movement of the lock ring 20, it is possible to shorten the time for the lock ring 20 to reach the lock position or the unlock position. Further, the collision sound between the lock ring 20 and the elastic member 54 can be reduced by, for example, performing control to reduce the rotation speed of the motor 70 based on the amount of movement of the lock ring 20.

In the present embodiment, the lock ring 20 includes the first contact portion 25 that comes into contact with the holding frame 30 in the lock position and the second contact portion 26 that comes into contact with the holding frame 30 in the unlock position, and the control unit 112 reduces the moving speed of the lock ring 20 based on the detected amount of movement of the lock ring 20 before the holding frame 30 comes into contact with the first contact portion 25 or the second contact portion 26. This reduces the collision noise between the lock ring 20 and the elastic member 54.

In the present embodiment, the control unit 112 stops the driving of the motor 70 after the holding frame 30 comes into contact with the first contact portion 25 or the second contact portion 26 based on the detected amount of movement of the lock ring 20. Thus, the lock ring 20 can be reliably stopped in the lock position or the unlock position, so that the reliability of the movement control of the lock ring 20 is improved.

The control unit 112 moves the lock ring 20 at a first speed until the predetermined time Ta elapses when the movement of the lock ring 20 is started, and moves the lock ring 20 at a second speed faster than the first speed when the predetermined time Ta elapses. This reduces collision noise generated due to backlash between the pinion gear 71 attached to the rotation shaft of the motor 70 and the gear portion 22.

In the present embodiment, the control unit 112 controls the motor 70 based on the number of edges of the digital signal based on the signal indicating the detection state of the light from the light-emitting unit 57a in the light-receiving unit 57b. Thus, the amount of movement of the lock ring 20 can be accurately detected.

Further, in the present embodiment, the amount of movement of the lock ring 20 is detected without contacting the lock ring 20. This prevents unnecessary load on the motor 70 because the movement of the lock ring 20 is not interfered.

Further, in the present embodiment, the blur correction device 80 includes the restricting member 58 that restricts the movement of the lock ring 20 when the lock ring 20 is in the lock position. This inhibits the lock ring 20 from moving from the locked position due to vibration or impact when the lock ring 20 is in the lock position, thereby improving the reliability of the movement control of the movable frame 60 by the lock ring 20.

In the above described embodiment, the amount of movement of the lock ring 20 is detected by using the comb-teeth portion 27 formed in a part of the lock ring 20 and the photointerrupter 57. For example, a scale having a repetitive reflective pattern may be provided on the lock ring 20, and a reflective photosensor may be provided on the fixed frame 50 to detect the amount of movement of the lock ring 20. Alternatively, a scale having a reflective pattern may be provided on the fixed frame 50, and a reflective photosensor may be provided on the lock ring 20. Further, the lock ring 20 may be provided with the photointerrupter 57, and the fixed frame 50 may be provided with the comb-teeth portion 27.

In the above-described embodiment, the rotation speed of the motor 70 is controlled based on the amount of movement of the lock ring 20. However, for example, the moving speed (rotation speed) of the lock ring 20 may be calculated from the amount of movement of the lock ring 20, and the motor 70 may be controlled based on the moving speed of the lock ring 20. For example, when the moving speed of the lock ring 20 becomes equal to or higher than a threshold value, the amount of energization of the motor 70 may be reduced or the duty ratio may be reduced to reduce the collision sound between the lock ring 20 and the elastic member 54.

In the above-described embodiment, the lens moving type blur correction device 80 that drives the lens group L6 has been described. However, this does not intend to suggest any limitation, and the above-described embodiment can be applied to an image sensor moving type blur correction device that drives an image sensor. For example, one of a detecting unit or a detected unit may be provided on a holding member that movably holds the imaging element, the other of the detecting unit or the detected unit may be provided on a lock member that can lock the imaging element with respect to the holding member, and the amount of movement of the lock member with respect to the holding member may be detected.

In addition, although the lock ring 20 has been described as an example in the above-described embodiment, this does not intend to suggest any limitation, and the above-described embodiment can be applied to a configuration in which the lens group L6 is locked by moving the lock member in the optical axis direction.

In addition, the blur correction device described in the above embodiment can be applied not only to a compact digital camera or a single-lens reflex digital camera but also to optical devices such as a video camera, binoculars, a microscope, a telescope, and a mobile phone.

The embodiments described above are examples of preferred implementations. However, the present invention is not limited thereto, and various modifications can be made without departing from the scope of the present invention, and arbitrary constituent elements may be combined.

DESCRIPTION OF REFERENCE NUMERALS

20 lock ring
25 first contact portion
26 second contact portion
27 comb-teeth portion
30 holding frame
57a light-emitting unit
57b light-receiving unit
58 restriction member
60 movable frame
70 motor
80 blur correction device
90X, 90Y VCM
112 control unit
L6 lens group

The invention claimed is:

1. A blur correction device comprising:

a lens holding frame that holds a lens;

a holding frame that movably holds the lens holding frame;

a first drive unit that drives the lens holding frame with respect to the holding frame in a direction intersecting an optical axis;

a lock member configured to move between a lock position that restricts movement of the lens holding frame and a release position that releases restriction;

a detection unit configured to detect an amount of movement of the lock member;

a second drive unit that drives the lock member; and a control unit configured to control the second drive unit based on the amount of movement of the lock member detected by the detection unit, wherein the lock member includes a contact portion that comes into contact with the holding frame in at least one of the release position or the lock position, wherein the contact portion includes a first contact portion that comes into contact with the holding frame in the release position and a second contact portion that comes into contact with the holding frame in the lock position, and wherein the control unit reduces a moving speed of the lock member before the holding frame comes into contact with the first contact portion or the second contact portion based on the amount of movement of the lock member detected by the detection unit.

2. The blur correction device according to claim 1, wherein the control unit stops driving of the second drive unit after the holding frame comes into contact with the first contact portion or the second contact portion based on the amount of movement of the lock member detected by the detection unit.

3. The blur correction device according to claim 1, wherein the detection unit detects the amount of movement of the lock member without contacting the lock member.

4. The blur correction device according to claim 1, further comprising:

a restriction member that restricts movement of the lock member when the lock member is in the lock position.

5. A lens barrel comprising the blur correction device according to claim 1.

6. An imaging apparatus comprising the blur correction device according to claim 1.

7. The blur correction device according to claim 1, wherein the holding frame includes an elastic member that comes into contact with the lock member in at least one of the release position or the lock position, wherein the detection unit includes a light-emitting unit and a light-receiving unit, wherein the light-emitting unit is provided in a part of the holding frame, and wherein the light-receiving unit is provided in a part of the lock member.

8. The blur correction device according to claim 1, wherein the first contact portion and the second contact portion are arranged on a same circumference centered on the optical axis.

9. The blur correction device according to claim 1, wherein the lock member includes a gear portion to which a drive force from the second drive unit is transmitted, wherein the first contact portion, the second contact portion, and the gear portion are arranged on a same circumference centered on the optical axis, and wherein the gear portion, the second contact portion, and the first contact portion are arranged in this order along a circumferential direction of a circle centered on the optical axis.

10. A blur correction device comprising:

a lens holding frame that holds a lens;

a holding frame that movably holds the lens holding frame;

a first drive unit that drives the lens holding frame with respect to the holding frame in a direction intersecting an optical axis;

a lock member configured to move between a lock position that restricts movement of the lens holding frame and a release position that releases restriction;

a detection unit configured to detect an amount of movement of the lock member;

a second drive unit that drives the lock member; and a control unit configured to control the second drive unit based on the amount of movement of the lock member detected by the detection unit, wherein the control unit moves the lock member at a first speed until a predetermined time elapses when the control unit starts moving the lock member, and the control unit moves the lock member at a second speed faster than the first speed when the predetermined time has elapsed.

11. The blur correction device according to claim 10, wherein the lock member includes a contact portion that comes into contact with the holding frame in at least one of the release position or the lock position, wherein the detection unit includes a light-emitting unit and a light-receiving unit, wherein the light-emitting unit is provided in a part of the holding frame, and wherein the light-receiving unit is provided in a part of the lock member.

12. The blur correction device according to claim 11, wherein the detection unit includes a comb-teeth portion formed in a part of the lock member, wherein the light-emitting unit and the light-receiving unit face each other across the comb-teeth portion, and wherein the control unit controls the second drive unit based on a number of edges of a digital signal based on a signal indicating a detection state of the light from the light-emitting unit in the light-receiving unit.

13. The blur correction device according to claim 10, wherein the holding frame includes an elastic member that comes into contact with the lock member in at least one of the release position or the lock position.

14. The blur correction device according to claim 10, wherein the detection unit detects the amount of movement of the lock member without contacting the lock member.

15. The blur correction device according to claim 10, further comprising:

a restriction member that restricts movement of the lock member when the lock member is in the lock position.

16. The blur correction device according to claim 10, wherein the lock member includes a contact portion that comes into contact with the holding frame in at least one of the release position or the lock position, wherein the contact portion includes a first contact portion that comes into contact with the holding frame in the release position and a second contact portion that comes into contact with the holding frame in the lock position, and wherein the first contact portion and the second contact portion are arranged on a same circumference centered on the optical axis.

17. The blur correction device according to claim 10, wherein the lock member includes a contact portion that comes into contact with the holding frame in at least one of the release position or the lock position;

wherein the lock member includes a gear portion to which a drive force from the second drive unit is transmitted, wherein the contact portion includes a first contact portion that comes into contact with the holding frame in the release position and a second contact portion that comes into contact with the holding frame in the lock position, wherein the first contact portion, the second contact portion, and the gear portion are arranged on a same circumference centered on the optical axis, and wherein the gear portion, the second contact portion, and the first contact portion are arranged in this order along a circumferential direction of a circle centered on the optical axis.

18. A blur correction device comprising:

a lens holding frame that holds a lens;

a holding frame that movably holds the lens holding frame;

a first drive unit that drives the lens holding frame with respect to the holding frame in a direction intersecting an optical axis;

a lock member configured to move between a lock position that restricts movement of the lens holding frame and a release position that releases restriction; and a detection unit configured to detect an amount of movement of the lock member, wherein the lock member includes a protrusion portion that restricts movement of the lens holding frame, wherein the lock member, the holding frame, and the lens holding frame are arranged in this order along the optical axis, and wherein when the lock member is in the lock position, the protrusion portion penetrates through the inside of an opening portion of the holding frame and is in contact with the lens holding frame.

19. The blur correction device according to claim 18, wherein the protrusion portion is formed so as to protrude along the optical axis.

20. The blur correction device according to claim 18, wherein the amount of movement detected by the detection unit is an amount of rotation of the lock member.

* * * * *